(12) United States Patent
Toda

(10) Patent No.: US 11,393,063 B2
(45) Date of Patent: Jul. 19, 2022

(54) OBJECT DETECTING METHOD, OBJECT DETECTING DEVICE, AND ROBOT SYSTEM

(71) Applicant: Seiko Epson Corporation, Tokyo (JP)

(72) Inventor: Jun Toda, Shiojiri (JP)

(73) Assignee: Seiko Epson Corporation

(*) Notice: Subject to any disclaimer, the term of this patent is extended or adjusted under 35 U.S.C. 154(b) by 211 days.

(21) Appl. No.: 16/831,987

(22) Filed: Mar. 27, 2020

(65) Prior Publication Data

US 2020/0311854 A1 Oct. 1, 2020

(30) Foreign Application Priority Data

Mar. 28, 2019 (JP) .............................. JP2019-064848

(51) Int. Cl.
*G06K 9/00* (2022.01)
*G06T 1/00* (2006.01)
*B25J 9/16* (2006.01)
*G06V 20/20* (2022.01)
(Continued)

(52) U.S. Cl.
CPC ........... *G06T 1/0014* (2013.01); *B25J 9/1664* (2013.01); *B25J 9/1671* (2013.01); *B25J 9/1697* (2013.01); *G06V 20/20* (2022.01); *G06V 20/58* (2022.01); *G06V 20/653* (2022.01); *G06V 2201/07* (2022.01)

(58) Field of Classification Search
None
See application file for complete search history.

(56) References Cited

U.S. PATENT DOCUMENTS

2007/0177790 A1* 8/2007 Ban ...................... B25J 9/1697
382/153
2007/0282485 A1* 12/2007 Nagatsuka ............. B25J 9/1671
700/245

(Continued)

FOREIGN PATENT DOCUMENTS

| JP | 2013-117795 A | 6/2013 |
|---|---|---|
| JP | 5567922 B2 | 8/2014 |
| JP | 2016-099257 A | 5/2016 |

*Primary Examiner* — Guillermo M Rivera-Martinez
(74) *Attorney, Agent, or Firm* — Harness, Dickey & Pierce, P.L.C.

(57) ABSTRACT

An object detecting method includes imaging a plurality of target objects with an imaging section and acquiring a first image, recognizing an object position/posture of one of the plurality of target objects based on the first image, counting the number of successfully recognized object positions/postures of the target object, outputting, based on the object position/posture of the target object, a signal for causing a holding section to hold the target object, calculating, as a task evaluation value, a result about whether the target object was successfully held, updating, based on an evaluation indicator including the number of successfully recognized object positions/postures and the task evaluation value, a model for estimating the evaluation indicator from an imaging position/posture of the imaging section and determining an updated imaging position/posture, acquiring a second image in the updated imaging position/posture, and recognizing the object position/posture of the target object based on the second image.

9 Claims, 8 Drawing Sheets

(51) Int. Cl.
*G06V 20/58* (2022.01)
*G06V 20/64* (2022.01)

(56) References Cited

U.S. PATENT DOCUMENTS

| | | | | |
|---|---|---|---|---|
| 2008/0188983 | A1* | 8/2008 | Ban | G01B 21/042 |
| | | | | 700/245 |
| 2012/0229620 | A1* | 9/2012 | Ikeda | B25J 9/1692 |
| | | | | 348/94 |
| 2013/0141570 | A1* | 6/2013 | Saruta | G06K 9/6255 |
| | | | | 348/135 |
| 2013/0158710 | A1* | 6/2013 | Oda | B25J 9/1669 |
| | | | | 700/259 |
| 2014/0029800 | A1* | 1/2014 | Kotake | G06T 7/80 |
| | | | | 382/103 |
| 2015/0254380 | A1* | 9/2015 | Kimoto | B25J 9/1671 |
| | | | | 703/13 |
| 2016/0155235 | A1* | 6/2016 | Miyatani | G06K 9/036 |
| | | | | 382/103 |
| 2017/0004385 | A1* | 1/2017 | Aoba | G06T 7/75 |
| 2017/0028550 | A1* | 2/2017 | Terada | B25J 9/162 |
| 2017/0066131 | A1* | 3/2017 | Kamikawa | B25J 9/1697 |
| 2018/0257225 | A1* | 9/2018 | Satou | B25J 9/1697 |
| 2018/0272537 | A1* | 9/2018 | Ishigaki | G06T 7/74 |
| 2019/0039237 | A1* | 2/2019 | Nakashima | B25J 9/1664 |
| 2019/0295244 | A1* | 9/2019 | Adachi | G06N 3/08 |

\* cited by examiner

OBJECT DETECTING METHOD, OBJECT DETECTING DEVICE, AND ROBOT SYSTEM

The present application is based on, and claims priority from JP Application Serial Number 2019-064848, filed Mar. 28, 2019, the disclosure of which is hereby incorporated by reference herein in its entirety.

BACKGROUND

1. Technical Field

The present disclosure relates to an object detecting method, an object detecting device, and a robot system.

2. Related Art

When a robot performs work, it is necessary to cause the robot to recognize a position/posture of a target object such as work.

For example, JP A-2013-117795 (Patent Literature 1) discloses an information processing device including first acquiring means for acquiring, with a position and/or a posture of a target object set as a target object state, a distribution of probabilities of the target object being in the target object state with respect to target object states that the target object can take, second acquiring means for acquiring, from a captured image obtained by the imaging device imaging the target object having the target object state, a distribution of success rates of succeeding in identification of the target object with respect to a predetermined relative target object state for a position/posture of an imaging device, and determining means for determining, based on the distribution of the success rates with respect to the predetermined relative target object state and the distribution of the probabilities for each of a plurality of positions/postures that the imaging device can take, a position/posture that the imaging device should take. With such an information processing device, it is possible to determine a position and a posture of the imaging device that improve identification accuracy of the target object in an image captured using the imaging device. Consequently, it is possible to control a robot arm and pick the target object based on the determined position/posture.

However, in the information processing device described in Patent Literature 1, when a pile of target components are picked, identification accuracy is likely to be deteriorated in a situation in which conditions such as illumination for a target object or a state of piled target objects changes.

SUMMARY

An object detecting method according to an application example of the present disclosure is an object detecting method for detecting a position/posture of a target object, the object detecting method including: imaging a plurality of the target objects with an imaging section and acquiring a first image; recognizing the position/posture of the target object based on the first image; counting, as a number of recognized object positions/postures, a number of successfully recognized positions/postures of the target object; outputting, based on the position/posture of the target object, a signal for causing a holding section to hold the target object; calculating, as a task evaluation value, a result about whether the target object was successfully held; updating, based on an evaluation indicator including the number of recognized object positions/postures and the task evaluation value, a model for estimating the evaluation indicator from an imaging position/posture of the imaging section and determining an updated imaging position/posture of the imaging section based on the model after the update; imaging the plurality of target objects in the updated imaging position/posture and acquiring a second image; and recognizing the position/posture of the target object based on the second image.

DESCRIPTION OF EXEMPLARY EMBODIMENTS

An object detecting method, an object detecting device, and a robot system according to the present disclosure are explained in detail below based on embodiments shown in the accompanying drawings.

1. First Embodiment 1.1 Robot System

First, a robot system according to a first embodiment is explained.

Figure 1:
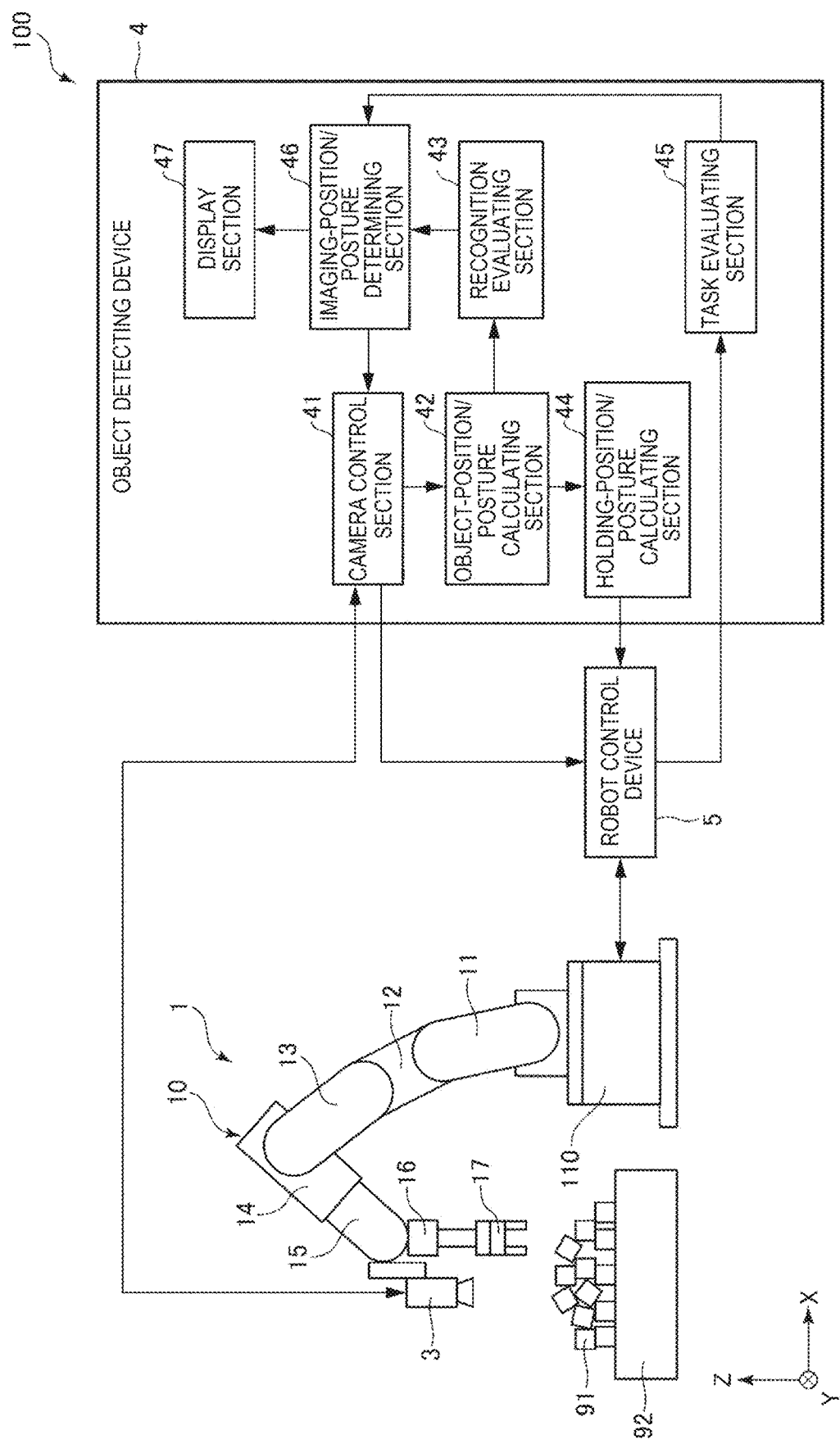
FIG. 1 is a functional block diagram showing a robot system according to a first embodiment.

FIG. 1 is a functional block diagram showing the robot system according to the first embodiment.

In FIG. 1, an X axis, a Y axis, and a Z axis are shown as three axes orthogonal to one another. For convenience of explanation, a distal end direction of the Z axis is represented as "upper" and a proximal end direction of the Z axis is represented as "lower".

A robot system 100 shown in FIG. 1 is used for work such as holding, conveyance, and assembly of a target object 91 (an object) such as an electronic component. The robot system 100 includes a robot 1 including a robot arm 10, a camera 3 (an imaging section) having an imaging function set in the robot arm 10, an object detecting device 4 that detects the target object 91, and a robot control device 5 that controls driving of the robot 1 based on a result of the detection by the object detecting device 4. The sections are explained in order below.

1.1.1 Robot

The robot 1 shown in FIG. 1 is a so-called six-axis vertical articulated robot and includes a base 110 and a robot arm 10 coupled to the base 110.

The base 110 is a portion for attaching the robot 1 to any setting place. In this embodiment, the base 110 is set in a setting place such as a floor. The setting place of the base 110 is not limited to the floor or the like and may be, for example, a wall, a ceiling, or a movable truck. Therefore, the Z axis in FIG. 1 is not limited to a vertical axis.

The proximal end of the robot arm 10 shown in FIG. 1 is coupled to the base 110. The robot arm 10 includes an arm 11, an arm 12, an arm 13, an arm 14, an arm 15, and an arm 16. The arms 11 to 16 are coupled in this order from the proximal end to the distal end of the robot arm 10. The arms 11 to 16 are capable of turning with respect to the arms adjacent thereto or the base 110.

The robot 1 includes, although not shown in FIG. 1, a driving device that turns the arm 11 with respect to the base 110, a driving device that turns the arm 12 with respect to the arm 11, a driving device that turns the arm 13 with respect to the arm 12, a driving device that turns the arm 14 with respect to the arm 13, a driving device that turns the arm 15 with respect to the arm 14, and a driving device that turns the arm 16 with respect to the arm 15. The driving devices include motors, controllers that control driving of the motors, and encoders that detect rotation amounts of the motors. The driving devices are controlled independently from one another by the robot control device 5.

As shown in FIG. 1, an end effector 17 capable of sucking the target object 91 is attached to the distal end of the robot arm 10. The end effector 17 includes, for example, a gripping hand, a suction hand, and a magnetic hand. The end effector 17 holds the target object 91 placed on a table 92 and performs various kinds of work.

1.1.2 Imaging Section

The camera 3 shown in FIG. 1 is attached to the distal end portion of the robot arm 10. An imaging position/posture of the camera 3 shown in FIG. 1 is changed by driving the robot arm 10. The camera 3 can image the target object 91 placed on the table 92. The "imaging position/posture" is, for example, a position/posture in six degrees of freedom for the camera 3.

The camera 3 is communicably coupled to the object detecting device 4. The coupling between the camera 3 and the object detecting device 4 may be coupling by radio other than coupling by wire.

The camera 3 is one or both of a device capable of acquiring two-dimensional images such as a color image, a monochrome image, and an infrared image of the target object 91 and the periphery of the target object 91, that is, a 2D camera and a device capable of acquiring a depth image (surface point group data) of the target object 91 and the periphery of the target object 91, that is, a 3D camera. Examples of the device capable of acquiring the depth image include a three-dimensional measuring device that measures a three-dimensional shape of an imaging target with, for example, a phase shift method or an active stereo method.

1.1.3 Object Detecting Device

The object detecting device 4 is communicably coupled to the camera 3 and the robot control device 5. The coupling between the object detecting device 4 and the robot control device 5 may be coupling by radio other than coupling by wire.

The object detecting device 4 shown in FIG. 1 includes a camera control section 41 (an imaging control section), an object-position/posture calculating section 42, a recognition evaluating section 43, a holding-position/posture calculating section 44, a task evaluating section 45, an imaging-position/posture determining section 46, and a display section 47. For example, in order to hold, with the end effector 17, a plurality of the target objects 91 loaded in bulk on the table 92, the object detecting device 4 shown in FIG. 1 detects the target object 91 and estimates an object position/posture of the target object 91. The object detecting device 4 can control the operation of the robot 1 via the robot control device 5 based on a result of the detection and a result of the estimation and cause the end effector 17 to hold the target object 91. The "object position/posture" is a position/posture in six degrees of freedom for the target object 91 and is, for example, a position along the X axis, a position along the Y axis, a position along the Z axis, a posture about an azimuth angle, a posture about an elevation angle, and a posture about a rotation angle.

The sections of the object detecting device 4 are explained below.

The camera control section 41 shown in FIG. 1 is coupled to the camera 3, causes the camera 3 to image the target object 91 placed on the table 92, and acquires a first image and a second image. The camera control section 41 outputs the acquired first image and the acquired second image respectively to the object-position/posture calculating section 42. For example, when the camera 3 is configured by both of the 2D camera and the 3D camera, the first image and the second image are respectively formed by two-dimensional images and depth images.

When the camera control section 41 changes the imaging position/posture of the camera 3 based on information concerning an imaging position/posture output from the imaging-position/posture determining section 46, the camera control section 41 outputs a control signal for the robot arm 10 to the robot control device 5. The camera control section 41 controls the robot arm 10 via the robot control device 5 and changes the imaging position/posture of the camera 3.

The object-position/posture calculating section 42 shown in FIG. 1 recognizes an object position/posture of the target object 91 based on the first image or the second image output from the camera control section 41. Specifically, the object-position/posture calculating section 42 detects the target object 91 from the first image or the second image and performs an arithmetic operation for estimating an object position/posture of the detected target object 91. The object-position/posture calculating section 42 outputs a calculation result of the object position/posture to the recognition evaluating section 43 and the holding-position/posture calculating section 44.

The recognition evaluating section 43 shown in FIG. 1 counts the number of recognized object positions/postures of the first image based on the calculation result output from the object-position/posture calculating section 42. Specifically, the recognition evaluating section 43 sets, as the number of recognized object positions/postures, the number of object positions/postures of the target object 91 successfully calculated from the first image in the object-position/posture calculating section 42. The recognition evaluating section 43 outputs the number of recognized object positions/postures to the imaging-position/posture determining section 46.

The holding-position/posture calculating section 44 shown in FIG. 1 calculates, based on the object position/posture of the target object 91 output from the object-position/posture calculating section 42, a holding position/posture of the end effector 17 (a holding section) that holds the target object 91. The holding-position/posture calculating section 44 can calculate the holding position/posture based on a database stored for each of types of the target object 91. When the target object 91 is sucked and held by, for example, a suction hand, an object position/posture of a surface (a suction surface) suitable for the suction only has to be registered in the database in advance. Consequently, the holding-position/posture calculating section 44 can calculate an object position/posture of the suction surface based on the object position/posture of the target object 91. Therefore, the holding-position/posture calculating section 44 can calculate a holding position/posture of the end effector 17 based on the object position/posture of the suction surface. When the target object 91 is gripped by, for example, a gripping hand, an object position/posture of a surface suitable for the gripping only has to be registered in the database in advance. Consequently, the holding-position/posture calculating section 44 can calculate a holding position/posture of the end effector 17 suitable for the gripping. The holding-position/posture calculating section 44 outputs the holding position/posture of the end effector 17 to the robot control device 5. That is, in order to cause the end effector 17 to grip the target object 91 in the holding position/posture, the holding-position/posture calculating section 44 outputs a control signal for holding the target object 91 to the robot control device 5. The "holding position/posture" is, for example, a position/posture in six degrees of freedom for the end effector 17.

The task evaluating section 45 shown in FIG. 1 acquires a result about whether the target object 91 was successfully held by the end effector 17 (the holding section), that is, information concerning success or failure of the holding. The task evaluating section 45 outputs the success or failure of the holding to the imaging-position/posture determining section 46 as a task evaluation value. The success or failure of the holding can be calculated based on a detection result of, for example, a camera that images the end effector 17 or a force detector attached to the end effector 17. The camera for confirming the success or failure of the holding may be the same as or may be different from the camera 3 explained above.

The imaging-position/posture determining section 46 shown in FIG. 1 calculates an evaluation indicator including the number of recognized object positions/postures output from the recognition evaluating section 43 and the task evaluation value output from the task evaluating section 45. The imaging-position/posture determining section 46 updates, based on the evaluation indicator, an estimation model for estimating an evaluation indicator from an imaging position/posture and determines an imaging position/posture of the camera 3 based on the estimation model after the update. The imaging-position/posture determining section 46 outputs the determined imaging position/posture to the camera control section 41.

The display section 47 shown in FIG. 1 is communicably coupled to the imaging-position/posture determining section 46. The object detecting device 4 shown in FIG. 1 includes a display section 47 that displays at least one of the number of recognized object positions/postures output from the recognition evaluating section 43, the task evaluation value output from the task evaluating section 45, and the evaluation indicator including the number of recognized object positions/postures and the task evaluation value.

Since the object detecting device 4 includes such a display section 47, for example, it is possible to confirm, as a numerical value, appropriateness of an estimation model in the object detecting device 4. Consequently, it is possible to visually confirm an indicator for quantitatively evaluating soundness of the object detecting device 4.

Examples of the display section 47 include a liquid crystal display device. Information displayed on the display section 47 is not limited to the information described above and may be other information.

The configuration of the object detecting device 4 according to the first embodiment is explained above. The operation of the object detecting device 4, that is, an object detecting method is explained in detail below.

Figure 2:
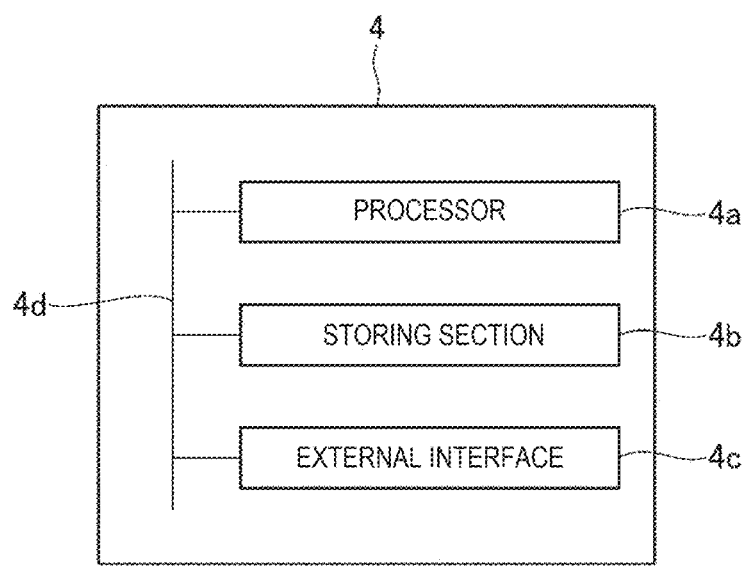
FIG. 2 is a diagram showing an example of a hardware configuration of an object detecting device shown in FIG. 1.

FIG. 2 is a diagram showing an example of a hardware configuration of the object detecting device 4 shown in FIG. 1.

The object detecting device 4 shown in FIG. 2 includes a processor 4a, a storing section 4b, and an external interface 4c. These components are communicably coupled to one another via a system bus 4d.

The processor 4a includes a CPU (Central Processing Unit). The processor 4a reads out and executes various programs and the like stored in the storing section 4b. Consequently, the processor 4a realizes various arithmetic operations, various kinds of processing, and the like in the object detecting device 4.

The storing section 4b stores various programs and the like executable by the processor 4a. Examples of the storing section 4b include a volatile memory such as a RAM (Random Access Memory), a nonvolatile memory such as a ROM (Read Only Memory), and a detachable external storage device. Besides the programs, data output from the sections explained above, setting values, and the like are also stored in the storing section 4b.

Examples of the external interface 4c include a wired LAN (Local Area Network) and a wireless LAN.

The functions of the sections of the object detecting device 4 are realized by the processor 4a executing the programs. However, at least a part of the functions may be realized on hardware.

The object detecting device 4 may be disposed in a housing of the robot 1, may be disposed outside the housing, or may be provided in a remote place via a network or the like.

1.1.4 Robot Control Device

The robot control device 5 has a function of controlling the operation of the robot 1. As shown in FIG. 1, the robot control device 5 is communicably coupled to the robot 1 and the object detecting device 4. The robot control device 5 may be coupled respectively to the robot 1 and the object detecting device 4 by wire or by radio. A display device such as a monitor, an input device such as a keyboard or a touch panel, and the like may be coupled to the robot control device 5.

Although not shown in FIG. 1, the robot control device 5 includes a processor, a storing section, and an external interface. These components are communicably coupled to one another via various buses.

The processor includes a processor such as a CPU (Central Processing Unit) and executes various programs stored in the storing section. Consequently, it is possible to realize processing such as control of driving of the robot 1, various arithmetic operations, and determination.

1.2 Object Detecting Method

An object detecting method according to the first embodiment is explained.

Figure 3:
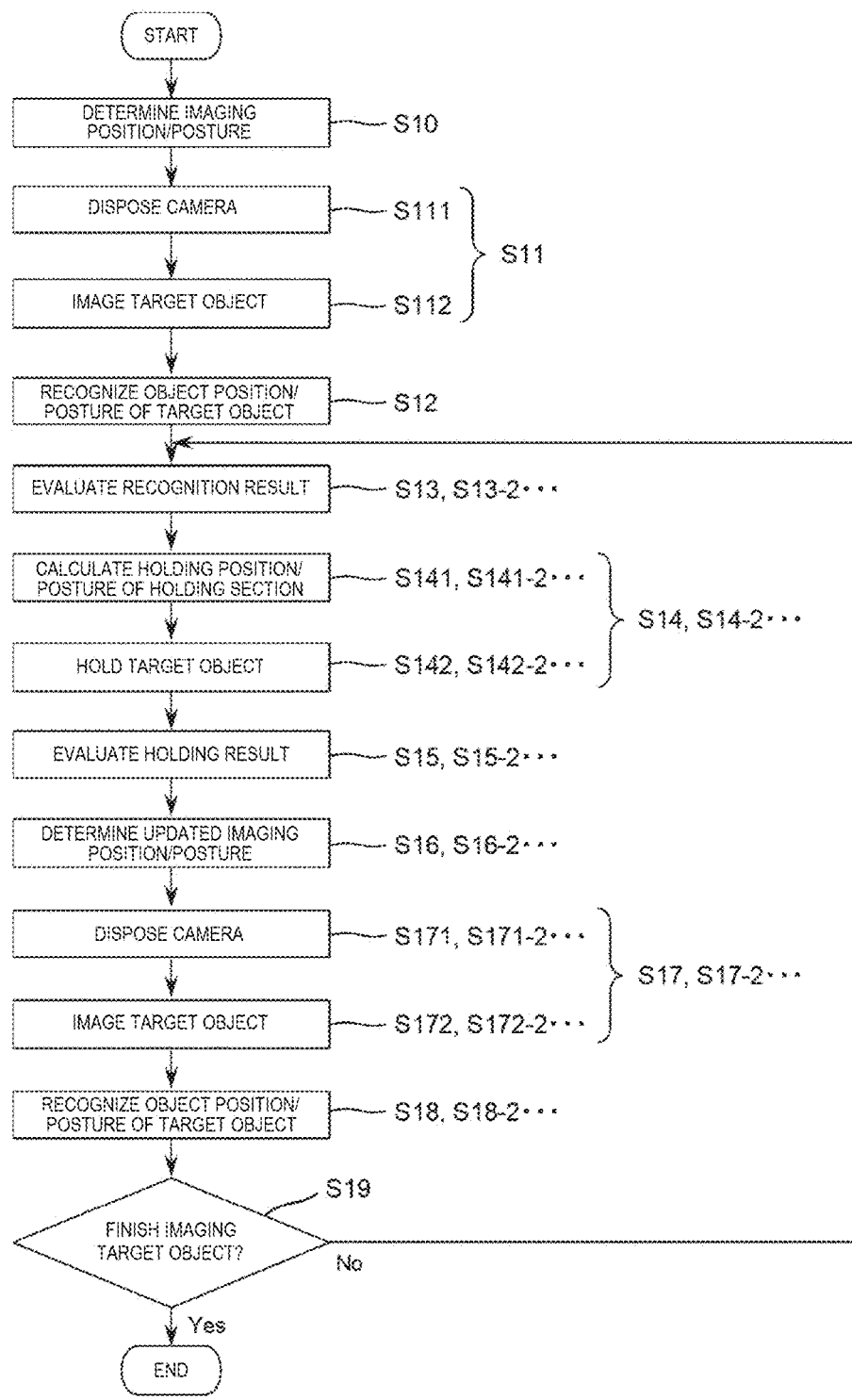
FIG. 3 is a flowchart showing an object detecting method according to the first embodiment.

FIG. 3 is a flowchart showing the object detecting method according to the first embodiment.

The object detecting method shown in FIG. 3 is a method of detecting an object position/posture of the target object 91. The object detecting method according to this embodiment makes it possible to stably detect the target object 91 even if, for example, a state of the target objects 91 loaded in bulk changes in a short time. The object detecting method makes it possible to control, based on a result of the detection of the target object 91, the operation of the robot 1 via the robot control device 5 and cause the end effector 17 to stably hold the target object 91.

The object detecting method shown in FIG. 3 is a method of detecting an object position/posture of the target object 91, the method including a step S10 of determining an imaging position/posture of the camera 3, a step S111 of disposing the camera 3 in the imaging position/posture, a step S112 of imaging the plurality of target objects 91 with the camera 3 and acquiring a first image, a step S12 of recognizing an object position/posture of the target object 91, a step S13 of counting the number of recognized object positions/postures and evaluating a result of the recognition, a step S141 of calculating a holding position/posture of the end effector 17, a step S142 of outputting a control signal for causing the end effector 17 to hold the target object 91, a step S15 of calculating, as a task evaluation value, a result about whether the target object 91 was successfully held and evaluating the holding result, a step S16 of updating an estimation model based on an evaluation indicator including the number of recognized object positions/postures and the task evaluation value and determining an updated imaging position/posture of the camera 3 based on the estimation model after the update, a step S171 of disposing the camera 3 in the updated imaging position/posture, a step S172 of imaging the target object 91 with the camera 3 and acquiring a second image, a step S18 of recognizing an object position/posture of the target object 91, and a step S19 of determining whether to finish imaging the target object 91.

With such an object detecting method, it is possible to determine, based on the fact that the imaging position/posture of the camera 3, which images the target object 91, affects success or failure of recognition of the target object 91 and success or failure of a task, the update imaging position/posture such that the number of recognitions and the number of task successes increase. Moreover, since the updated imaging position/posture can be sequentially changed during operation, it is possible to appropriately hold the target object 91 even when a peripheral environment of the target object 91 changes in a short time. Therefore, for example, even in work for holding the target object 91 in an environment in which conditions such as illumination easily change or work for holding piled target objects 91, it is possible to recognize the target object 91 without consuming labor and time for tuning for causing the object detecting device 4 to recognize the target object 91.

The steps are explained below one after another.

1.2.1 Determine an Imaging Position/Posture (Step S10)

First, the imaging-position/posture determining section 46 determines an imaging position/posture of the camera 3. Since this step is an initial state, an image for determining the imaging position/posture is absent. Therefore, in this stage, the imaging-position/posture determining section 46 may optionally determine the imaging position/posture. However, in this embodiment, the imaging-position/posture determining section 46 determines the imaging position/posture based on the estimation model stored by the imaging-position/posture determining section 46. The estimation model is a model for estimating the evaluation indicator from the imaging position/posture of the camera 3. In this step S10, which is a first step, the estimation model does not include content based on experiences in the past. Therefore, the imaging-position/posture determining section 46 only has to determine the imaging position/posture based on an optionally given estimation model.

Figure 4:
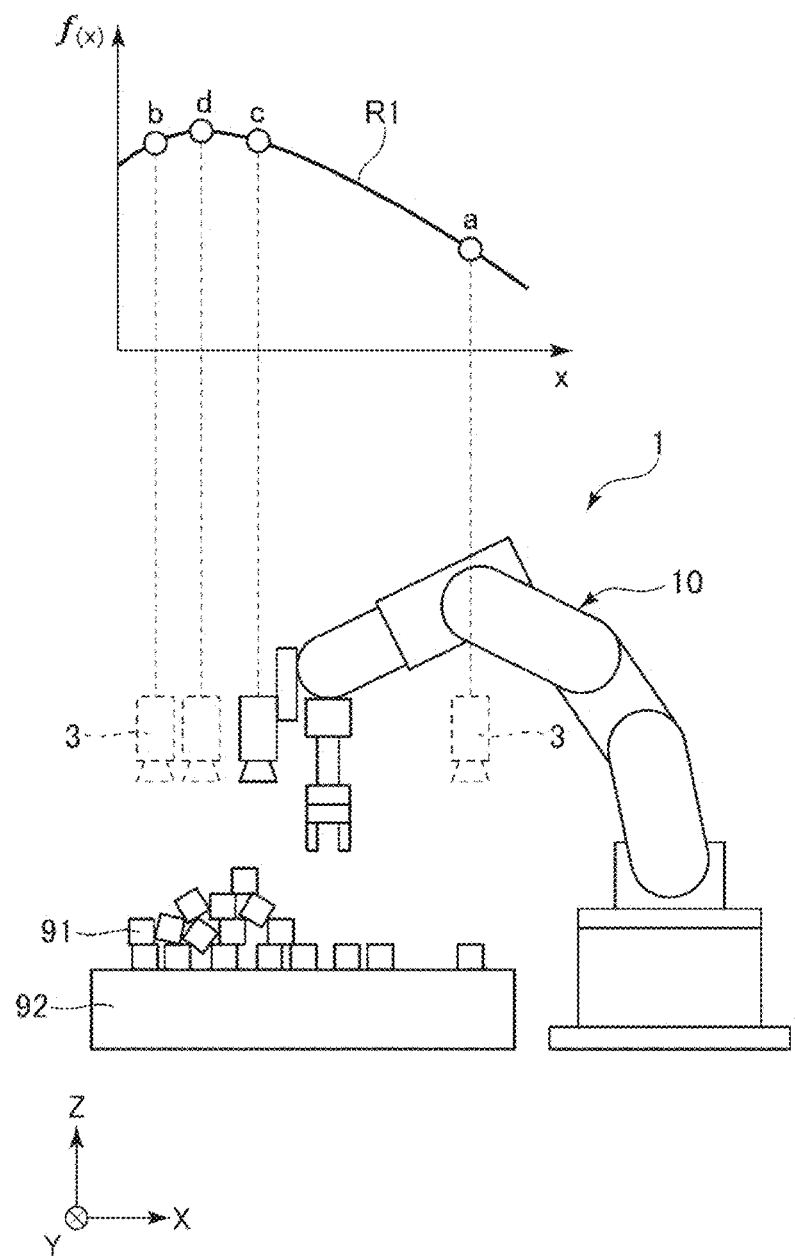
FIG. 4 is a graph showing a relation between target objects loaded in bulk and an example of an evaluation indicator for determining an imaging position/posture.

FIG. 4 is a graph showing a relation between the target objects 91 loaded in bulk and an example of an evaluation indicator for determining an imaging position/posture. The imaging position/posture of the camera 3 has six degrees of freedom. In FIG. 4, only a position x, which is a degree of freedom of translation along the X axis, is shown. In the following explanation, only the translation along the X axis is explained. Therefore, although not explained in this embodiment, the object detecting method is also capable of determining, for the remaining five degrees of freedom, that is, translation along the Y axis, translation along the Z axis, a posture around the X axis, a posture around the Y axis, and a posture around the Z axis, appropriate imaging positions/postures corresponding to the numbers of recognitions and the numbers of task successes.

In FIG. 4, a position "a" is shown as an example of the imaging position/posture determined in this step.

1.2.2 Camera Disposition (Step S111)

Subsequently, the camera control section 41 moves the camera 3 to take the determined imaging position/posture. That is, the camera control section 41 moves the camera 3 such that the position x along the X axis of the camera 3 reaches the position "a". In this embodiment, the camera 3 is attached to the distal end portion of the robot arm 10. The camera control section 41 outputs a control signal to the robot control device 5 based on the imaging position/posture output from the imaging-position/posture determining section 46. Consequently, the camera control section 41 controls the robot arm 10 and moves the camera 3 to take a target imaging position/posture.

1.2.3 Target Object Imaging (Step S112)

Subsequently, in the imaging position/posture, the camera 3 captures a first image to put the plurality of target objects 91 in the same visual field. The camera control section 41 acquires the captured first image. The camera control section 41 outputs the first image to the object-position/posture calculating section 42.

1.2.4 Target Object Position/Posture Recognition (Step S12)

Subsequently, the object-position/posture calculating section 42 recognizes an object position/posture of the target object 91 based on the first image. Recognizing an object position/posture of the target object 91 means both of detecting the target object 91 in the first image and estimating an object position/posture of the target object 91.

Examples of one of specific methods of detecting the target object 91 in the first image include a method of specifying a contour of the target object 91 based on, for example, contrast of a two-dimensional image included in the first image.

Examples of one of specific methods of recognizing an object position/posture of the target object 91 include a method of matching the first image and design data of the target object 91. The design data of the target object 91 is, for example, data of three-dimensional CAD (Computer-Aided Design) that can be treated in three-dimensional design drawing software and data of three-dimensional CG (Computer Graphics) that is configured by constituent elements of a model such as dots, lines, and surfaces and can be treated by three-dimensional computer graphics software.

Examples of another one of the specific methods of recognizing an object position/posture of the target object 91 include a method of estimating an object position/posture of the target object 91 from the first image with machine learning using learning data represented by a pair of the first image and an object position/posture label. The object position/posture label is coordinate data representing the position of the target object 91 in the image.

Figure 5:
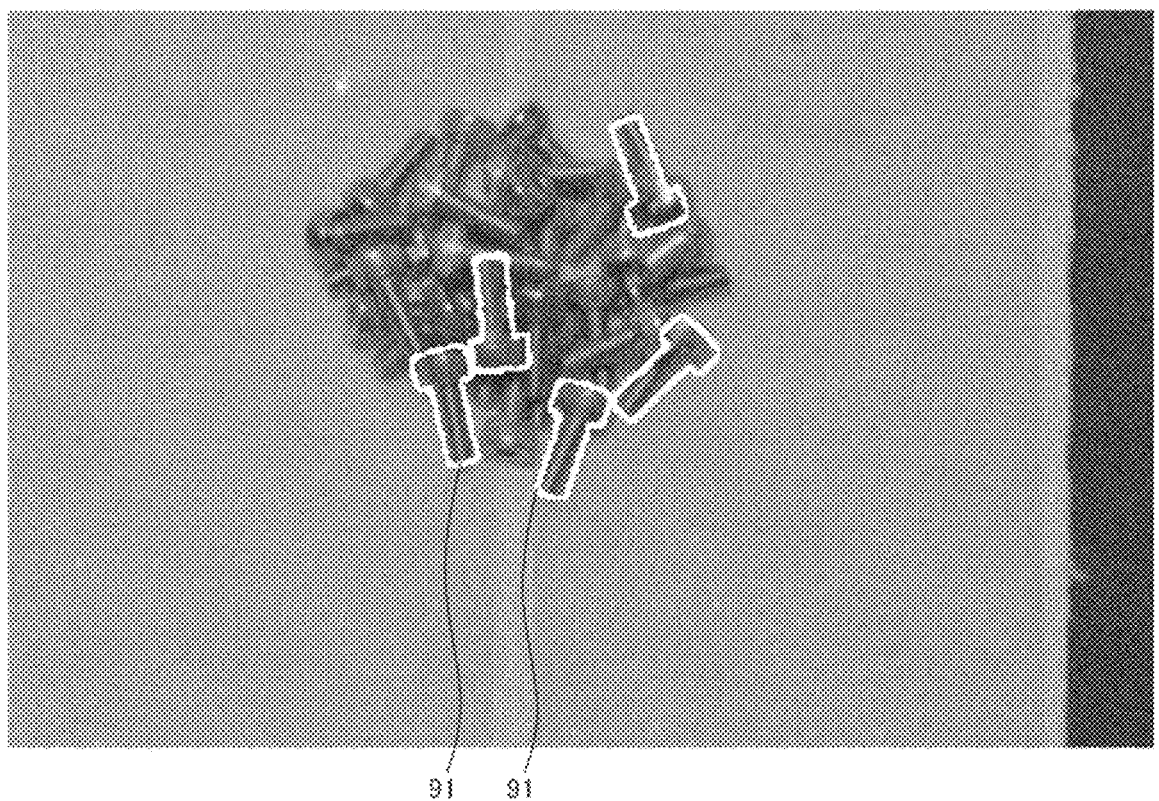
FIG. 5 is an example of a first image obtained by imaging a state in which bolts are used as target objects and the bolts are loaded in bulk.

FIG. 5 is an example of the first image obtained by imaging a state in which bolts are used as the target objects 91 and loaded in bulk. Lines surrounding the contours of the target objects 91 successfully recognized by the object-position/posture calculating section 42 are given to the target objects 91.

The first image is, for example, a two-dimensional image or a depth image and desirably includes both of the two-dimensional image and the depth image. By acquiring the first image, it is possible to recognize a position/posture of the target object 91 based on the first image.

When recognizing the object position/posture of the target object 91 in this way, the object-position/posture calculating section 42 outputs a result of the recognition, that is, the number of successfully recognized object positions/postures to the recognition evaluating section 43.

1.2.5 Recognition Result Evaluation (Step S13)

Subsequently, the recognition evaluating section 43 treats, as the number of recognized object positions/postures, the number of object positions/postures of the target object 91 successfully recognized in the first image. When the number of recognized object positions/postures is large, the recognition evaluating section 43 can evaluate that an imaging position/posture in which the first image is captured is an imaging position/posture in which the number of successful recognitions is large. The recognition evaluating section 43 outputs the number of recognized object positions/postures to the imaging-position/posture determining section 46.

When recognizing the plurality of target objects 91 in the first image, the recognition evaluating section 43 determines, out of the recognized plurality of target objects 91, one target object 91 that should be held by the end effector 17. A criterion for the determination is not particularly limited. Examples of the criterion include, besides a matching degree of a contour at the time when the estimation result is projected onto the two-dimensional image as shown in FIG. 5, a matching degree of depth at the time when the estimation result is projected onto the depth image and closeness of the camera 3 and the target object 91. The recognition evaluating section 43 outputs object position/posture information of the determined one target object 91 that should be held by the end effector 17 to the holding-position/posture calculating section 44.

1.2.6 End Effector Holding Position/Posture Calculation (Step S141)

Subsequently, the holding-position/posture calculating section 44 calculates, based on the object position/posture information of the one target object 91 that should be held by the end effector 17, a holding position/posture of the end effector 17 that holds the target object 91. For the calculation of a holding position/posture, as explained above, a database stored for each of types of the target object 91 is used and a holding position/posture of the end effector 17 optimum for holding the target object 91 is calculated based on the database.

1.2.7 Target Object Holding (Step S142)

The holding-position/posture calculating section 44 outputs a control signal for causing the end effector 17 to hold the target object 91 in the holding position/posture explained above. The holding-position/posture calculating section 44 outputs the control signal to the robot control device 5. The robot control device 5 controls driving of the robot 1 based on the control signal and causes the end effector 17 to change the holding position/posture of the end effector 17. The holding-position/posture calculating section 44 attempts to hold the target object 91 with the end effector 17.

1.2.8 Holding Result Evaluation (Step S15)

Subsequently, the task evaluating section 45 acquires, via the robot control device 5, a result about whether the target object 91 was successfully held by the end effector 17, that is, information concerning success or failure of the holding. The task evaluating section 45 calculates success or failure of the holding as a task evaluation value and outputs the task evaluation value to the imaging-position/posture determining section 46.

1.2.9 Updated Imaging Position/Posture Determination (Step S16)

Subsequently, the imaging-position/posture determining section 46 calculates an evaluation indicator including the number of recognized object positions/postures output from the recognition evaluating section 43 and the task evaluation value output from the task evaluating section 45. The imaging-position/posture determining section 46 reflects the calculated evaluation indicator on the estimation model stored in the imaging-position/posture determining section 46. The estimation model is, for example, a model using Bayesian inference. The Bayesian inference has a model based on experiences in the past. The model is updated by reflecting a most recent evaluation indicator on the model. Consequently, it is possible to determine an optimum updated imaging position/posture based on the experiences in the past and a most recent evaluation result.

Examples of the evaluation indicator calculated by the imaging-position/posture determining section 46 include a linear combination of the number of recognized object positions/postures and a task evaluation value indicated by the following expression.

$$f(x)=D(x)+S(x)$$

In the expression, f(x) represents an evaluation function representing the evaluation indicator, D(x) represents the number of recognized object positions/postures, and S(x) represents the task evaluation value. The task evaluation value is set to be a larger numerical value when the holding by the end effector 17 is successful than when the holding by the end effector 17 is unsuccessful. For example, when the number of recognized object positions/postures in one first image is ten, the task evaluation value at the time when holding attempted for one target object 91 detected from the first image is successful only has to be set to five and the task evaluation value at the time when the holding is unsuccessful only has to be set to zero. Then, the evaluation function f(x) at the time when the holding is successful is 10+5=15. The evaluation function f(x) at the time when the holding is unsuccessful is 10+0=10. In this way, the evaluation indicator including not only the number of recognized object positions/postures but also the task evaluation value is adopted and reflected on the estimation model to update the estimation model. Consequently, the estimation model is sequentially updated to search for the position x where a large number of target objects 91 can be recognized and the holding of the target object 91 tends to be successful.

By sequentially updating the estimation model, it is possible to cause the estimation model to follow a change in an environment around the target object 91. Consequently, by determining an updated imaging position/posture based on the estimation model, it is possible to calculate an updated imaging position/posture that can improve a success rate of the holding by the end effector 17.

A value of the task evaluation value is not limited to the value described above and may be any value.

In the Bayesian inference, the position x where a value of the evaluation function f(x) can be gradually increased is searched by acquiring the evaluation function f(x) for various positions x and reflecting the evaluation function f(x) on the estimation model. When the search is repeated, a correlation curve R1 shown in FIG. 4 representing a relation between the position x and the evaluation function f(x) is obtained. In FIG. 4, since the evaluation function f(x) is plotted on the vertical axis, a larger value of the evaluation function f(x) is represented toward the tip of the vertical axis. In this step, for convenience of explanation, it is assumed that, at this point in time, the correlation curve R1 is calculated to a certain extent through the search for the position x repeated several times.

Then, in the correlation curve R1 shown in FIG. 4, it can be estimated that it is possible to relatively increase the value of the evaluation function f(x) by changing the position x of the imaging position/posture from a position "a" to a position "b". Therefore, in this step, the imaging-position/posture determining section 46 determines the position "b" as a new imaging position/posture (an updated imaging position/posture) and outputs a result of the determination to the camera control section 41. The new imaging position/posture is, in terms of a probability, an imaging position/posture with a high success rate of the holding by the end effector 17.

1.2.10 Camera Disposition (Step S171)

Subsequently, the imaging-position/posture determining section 46 controls the driving of the robot arm 10 of the robot 1 and disposes the camera 3 to take the determined updated imaging position/posture.

1.2.11 Object Imaging (Step S172)

Subsequently, the camera 3 captures a second image to put the plurality of target objects 91 in the same visual field. The camera control section 41 acquires the captured second image. The camera control section 41 outputs the second image to the object-position/posture calculating section 42.

1.2.12 Target Object Position/Posture Recognition (Step S18)

The object-position/posture calculating section 42 recognizes an object position/posture of the target object 91 based on the second image. A method of recognizing the target object 91 based on the second image is the same as the method of recognizing the target object 91 based on the first image explained above.

When recognizing the object position/posture of the target object 91 in this way, the object-position/posture calculating section 42 outputs a result of the recognition, that is, the number of successfully recognized object positions/postures to the recognition evaluating section 43.

1.2.13 Determination Concerning whether to Finish Imaging the Target Object (Step S19)

Subsequently, the recognition evaluating section 43 determines whether to finish imaging the target object 91. If the holding of all the target objects 91 placed on the table 92 is completed, the recognition evaluating section 43 only has to finish the imaging. On the other hand, if the target object 91 that should be held still remains, the recognition evaluating section 43 returns to step S13 explained above.

The same steps as steps S13, S141, S142, S15, S16, S171, S172, and S18 are repeated by the number of the target objects 91. Consequently, it is possible to hold the target objects 91 one after another and update the estimation model.

The steps performed for the second time are explained as steps S13-2, S14-2 (S141-2 and S142-2), S15-2, S16-2, S17-2 (S171-2 and S172-2), and S18-2.

1.2.14 Recognition Result Evaluation (Step S13-2)

Subsequently, the recognition evaluating section 43 counts, as the number of recognized object positions/postures, the number of object positions/postures of the target object 91 successfully recognized in the second image.

The recognition evaluating section 43 determines, out of the target objects 91 recognized in the second image, one target object 91 that should be held by the end effector 17.

1.2.15 End Effector Holding Position/Posture Calculation (Step S141-2)

Subsequently, the holding-position/posture calculating section 44 calculates, based on the object position/posture information of the one target object 91 that should be held by the end effector 17, a holding position/posture of the end effector 17 that holds the target object 91. For the calculation of a holding position/posture, as explained above, a database stored for each of types of the target object 91 is used and a holding position/posture of the end effector 17 optimum for holding the target object 91 is calculated based on the database.

1.2.16 Target Object Holding (Step S142-2)

The holding-position/posture calculating section 44 outputs a control signal for causing the end effector 17 to hold the target object 91 in the holding position/posture explained above. The holding-position/posture calculating section 44 outputs the control signal to the robot control device 5. The robot control device 5 controls driving of the robot arm 10 of the robot 1 based on the control signal and causes the end effector 17 to change the holding position/posture of the end effector 17. The holding-position/posture calculating section 44 attempts holding of the target object 91 with the end effector 17.

1.2.17 Holding Result Evaluation (Step S15-2)

Subsequently, the task evaluating section 45 acquires, via the robot control device 5, a result about whether the target object 91 was successfully held by the end effector 17, that is, information concerning success or failure of the holding. The task evaluating section 45 calculates success or failure of the holding as a task evaluation value and outputs the task evaluation value to the imaging-position/posture determining section 46.

1.2.18 Updated Imaging Position/Posture Determination (Step S16-2)

Subsequently, the imaging-position/posture determining section 46 calculates an evaluation indicator including the number of recognized object positions/postures output from the recognition evaluating section 43 and the task evaluation value output from the task evaluating section 45. The imaging-position/posture determining section 46 reflects the calculated evaluation indicator on the estimation model stored in the imaging-position/posture determining section 46 and further updates the estimation model. Consequently, it is possible to determine an optimum updated imaging position/posture based on the estimation model after the update.

1.2.19 Camera Disposition (S171-2)

Subsequently, the imaging-position/posture determining section 46 controls the driving of the robot arm 10 of the robot 1 and disposes the camera 3 to take the determined updated imaging position/posture.

1.2.20 Object Imaging (Step S172-2)

Subsequently, the camera 3 captures a third image to put the plurality of target objects 91 in the same visual field. The camera control section 41 acquires the captured third image. The camera control section 41 outputs the third image to the object-position/posture calculating section 42.

1.2.21 Target Object Holding Position/Posture Recognition (Step S18-2)

Subsequently, the object-position/posture calculating section 42 recognizes a holding position/posture of the target object 91 based on the third image. A method of recognizing the target object 91 based on the third image is the same as the method of recognizing the target object 91 based on the first image explained above.

By further repeating, for the third time, the fourth time, and so on, the same steps as the steps S13-2, S141-2, S142-2, S15-2, S16-2, S171-2, S172-2, and S18-2, which are the steps performed for the second time, it is possible to continue to update the estimation model for searching for the position x where the value of the evaluation function f(x) increases. As a result, it is possible to continue to search for the position x where the success rate of holding the target object 91 is further increased.

When the estimation model is updated in this way, as shown in FIG. 4, the position x of the imaging position/posture moves to the position "a", the position "b", a position "c", and a position "d". Every time the position x moves, a larger value of the evaluation function f(x) is obtained. In the object detecting method according to this embodiment, it is possible to continue to search for an imaging position/posture for increasing the number of recognized object positions/postures and the task evaluation value. Therefore, it is possible to efficiently recognize and detect, for example, the target object 91 that can be expected to be held at a high success rate. Consequently, it is possible to efficiently perform the work for holding the target object 91.

The correction curve R1 changes every time the estimation model is updated. However, in FIG. 4, for convenience of explanation, it is assumed that the correlation curve R1 does not change. It is not essential that the value of the evaluation function f(x) always increases every time the estimation model is updated. The value of the evaluation function f(x) may decrease.

Summarizing the above, the object detecting method according to this embodiment is a method of detecting an object position/posture of the target object 91, the method including the step S11 (the steps S111 and S112) of imaging the plurality of target objects 91 with the camera 3 (the imaging section) and acquiring a first image, the step S12 of recognizing an object position/posture of the target object 91 based on the first image, the step S13 of counting, as the number of recognized object positions/postures, the number of successfully recognized object positions/postures of the target object 91, the step S14 (the steps S141 and S142) of outputting, based on the object position/posture of the target object 91, a control signal for causing the end effector 17 (the holding section) to hold the target object 91, the step S15 of calculating, as a task evaluation value, a result about whether the target object 91 was successfully held, the step S16 of updating, based on an evaluation indicator including the number of recognized object positions/postures and the task evaluation value, an estimation model for estimating the evaluation indicator from an imaging position/posture of the camera 3 and determining an updated imaging position/posture of the camera 3 based on the estimation model after the update, the steps S17 (the steps S171 and S172) of imaging the plurality of target objects 91 in the updated imaging position/posture and acquiring a second image, and the step S18 of recognizing the object position/posture of the target object 91 based on the second image.

With such an object detecting method, even when a peripheral environment of the target object 91 changes in a short time, it is possible to appropriately recognize the target object 91 following the change. Therefore, it is possible to cause, based on a result of the recognition, the robot 1 to hold the target object 91 at a high success rate. Consequently, for example, even in work for holding the target object 91 in an environment in which conditions such as illumination easily change or work for holding the piled target objects 91, it is possible to recognize the target object 91 without consuming labor and time for tuning for causing the object detecting device 4 to recognize the target object 91. As a result, it is possible to efficiently perform various kinds of work for the target object 91.

Figure 6:
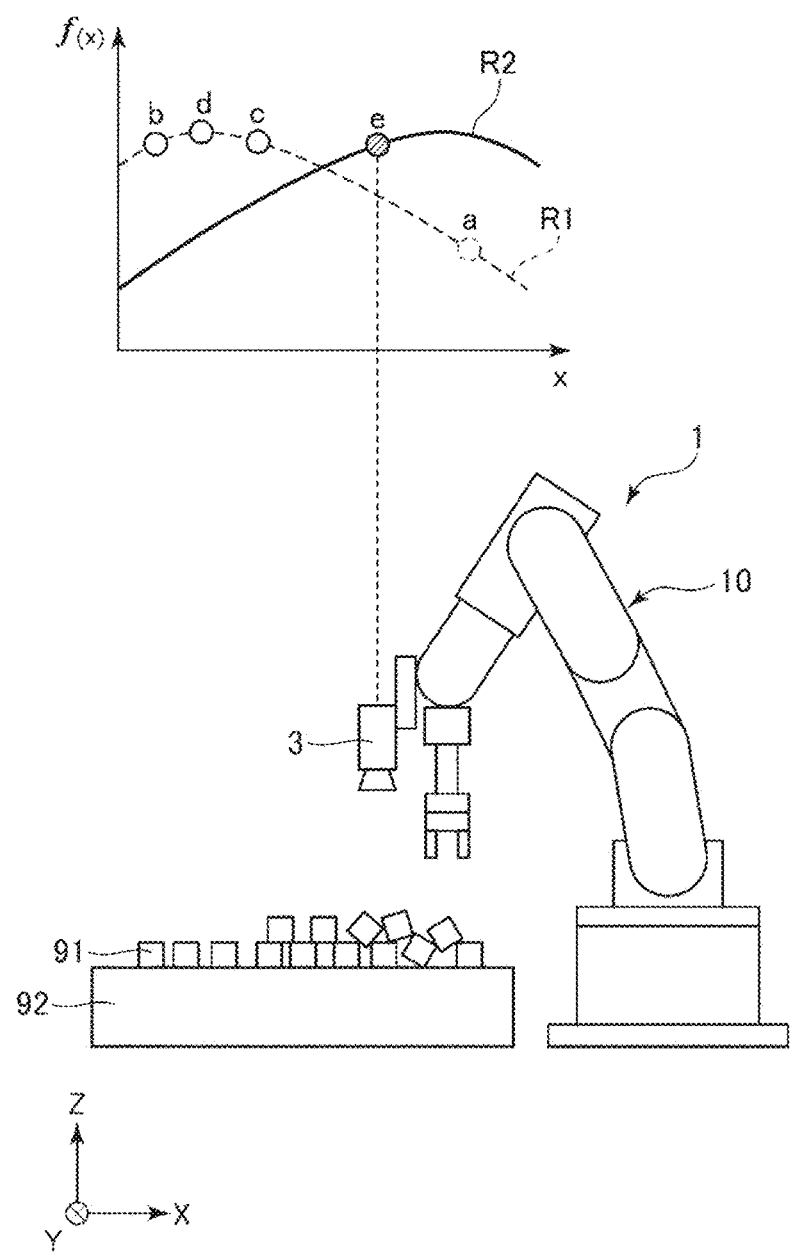
FIG. 6 is a diagram showing a case in which a bulk state of target objects has changed from a bulk state of the target objects shown in FIG. 4.

In FIG. 6, a bulk state of the target objects 91 has changed from the bulk state of the target objects 91 shown in FIG. 4. Specifically, the target objects 91 piled slightly on the left side on the table 92 in FIG. 4 are shifted slightly to the right side in FIG. 6. In such a case, the correlation curve R1 reflecting the bulk state shown in FIG. 4 does not reflect the bulk state shown in FIG. 6. Therefore, when it is attempted to hold the target object 91 in the bulk state shown in FIG. 6, in order to calculate an imaging position/posture for recognizing the target object 91 that can be expected to be held at a high success rate, it is necessary to reflect this change of the bulk state on an estimation model for estimating an evaluation indicator from the imaging position/posture.

Therefore, in this embodiment, it is desirable to use, as the estimation model used for determination of an imaging position/posture, a model of Bayesian inference into which the concept of a forgetting rate is introduced. The Bayesian inference is an algorithm for calculating an optimum updated imaging position/posture based on experiences in the past and a most recent evaluation result as explained above. By introducing the concept of the forgetting rate into the Bayesian inference, it is possible to introduce a premise that temporally closer data is more reliable. Consequently, the estimation model is updated while gradually forgetting experiences in the past. As a result, for example, about an evaluation indicator obtained in the imaging position/posture in the position "a" shown in FIG. 6, it is possible to weaken a reflection degree on the estimation model. Then, even if a change from the bulk state of the target objects 91 shown in FIG. 4 to the bulk state shown in FIG. 6 occurs, by repeating the update of the estimation model, it is possible to gradually eliminate the data of the bulk state shown in FIG. 4 from the estimation model. As a result, it is possible to gradually construct an estimation model optimized for the bulk state after the change.

When the estimation model optimized for the bulk state shown in FIG. 6 is constructed in this way, the correlation curve representing the relation between the position x and the evaluation function f(x) can be calculated as a new correlation curve R2. Based on the correlation curve R2, it can be estimated that a relatively large value of the evaluation function f(x) is obtained by setting the position x to, for example, a position "e" shown in FIG. 6. Consequently, even when the bulk state changes, it is possible to calculate a new updated imaging position/posture that can be expected to be held at a high success rate.

As the Bayesian inference into which the concept of the forgetting rate is introduced, for example, nonstationary SBL (Sparse Bayesian Learning) described in "Sparse Bayesian Learning for nonstationary data", Transactions of the Japanese Society for Artificial Intelligence, volume 23, first issue, E (2008), pages 50 to 57 can be used.

The task evaluation value may include an element other than the result about whether the target object 91 was successfully held by the end effector 17 (the holding section). Specifically, the task evaluation value may include a result obtained by causing the end effector 17 to perform work using the target object 91 after causing the end effector 17 to hold the target object 91. Examples of such work include, when the target object 91 is a bolt, work for inserting the bolt into a member, in which a female screw is formed, after holding the bolt with the end effector 17. Success or failure of such work is incorporated in the evaluation indicator like the success of failure of the holding explained above. Consequently, the estimation model updated using the evaluation indicator is updated using the task evaluation value including not only the success or failure of the holding but also the success or failure of the work performed using the held target object 91. Then, it is possible to calculate a new updated imaging position/posture that can be expected to have a high success rate not only for the success or failure of the holding but also for the success or failure of the work.

When the success or failure of the work is also incorporated in the evaluation indicator, the weight of the evaluation of the success or failure of the holding and the weight of the evaluation of the success or failure of the work may be differentiated by performing weighting.

The object detecting device 4 according to this embodiment is a device that detects an object position/posture of the target object 91, the device including the camera control section 41 (the imaging control section) that images a first image including the plurality of target objects 91 with the camera 3 (the imaging section) and acquires the first image, the object-position/posture calculating section 42 that recognizes an object position/posture of the target object 91 based on the first image, the recognition evaluating section 43 that counts, as the number of recognized object positions/postures, the number of successfully recognized object positions/postures of the target object 91, the holding-position/posture calculating section 44 that calculates, based on the object position/posture of the target object 91, a holding position/posture of the end effector 17 (the holding section), which holds the target object 91, and outputs a control signal for causing the end effector 17 to hold the target object 91 in the holding position/posture, the task evaluating section 45 that acquires a result about whether the target object 91 was successfully held by the end effector 17 and calculates a task evaluation value, and the imaging-position/posture determining section 46 that updates, based on an evaluation indicator including the number of recognized object positions/postures and the task evaluation value, an estimation model for estimating an evaluation indicator from an imaging position/posture of the camera 3 and determines an updated imaging position/posture of the camera 3 based on the estimation model after the update. The camera control section 41 causes the camera 3 to capture a second image in the updated imaging position/posture and acquires the second image. The object-position/posture calculating section 42 recognizes the object position/posture of the target object 91 based on the second image.

With such an object detecting device 4, since the estimation model for estimating the evaluation indicator from the imaging position/posture is sequentially updated, it is possible to calculate the updated imaging position/posture such that, for example, the target object 91 that can be expected to be held at a high success rate can be recognized. Therefore, it is possible to realize the robot system 100 having a high success rate of holding by including such the object detecting device 4.

Even when a peripheral environment of the target object 91 changes in a short time, it is possible to appropriately recognize the target object 91 by sequentially updating the estimation model. Consequently, for example, even in work for holding the target object 91 in an environment in which conditions such as illumination easily change or work for holding the collapsible piled target objects 91, it is possible to recognize, without consuming labor and time for tuning for causing the object detecting device 4 to recognize the target object 91, the target object 91 that can be expected to be held at a high success rate. As a result, it is possible to efficiently hold the target object 91 even under such an environment.

The robot system 100 according to this embodiment includes the robot 1 including the robot arm 10, the camera 3 (the imaging section) set in the robot arm 10, the object detecting device 4, and the robot control device 5 that controls driving of the robot 1 based on a detection result of the object detecting device 4.

With such a robot system 100, in the object detecting device 4, even when a peripheral environment of the target object 91 changes in a short time, it is possible to appropriately recognize the target object 91 in order to follow the change. Therefore, it is possible to easily realize the robot system 100 that can efficiently hold the target object 91.

2. Second Embodiment

A robot system according to a second embodiment is explained.

Figure 7:
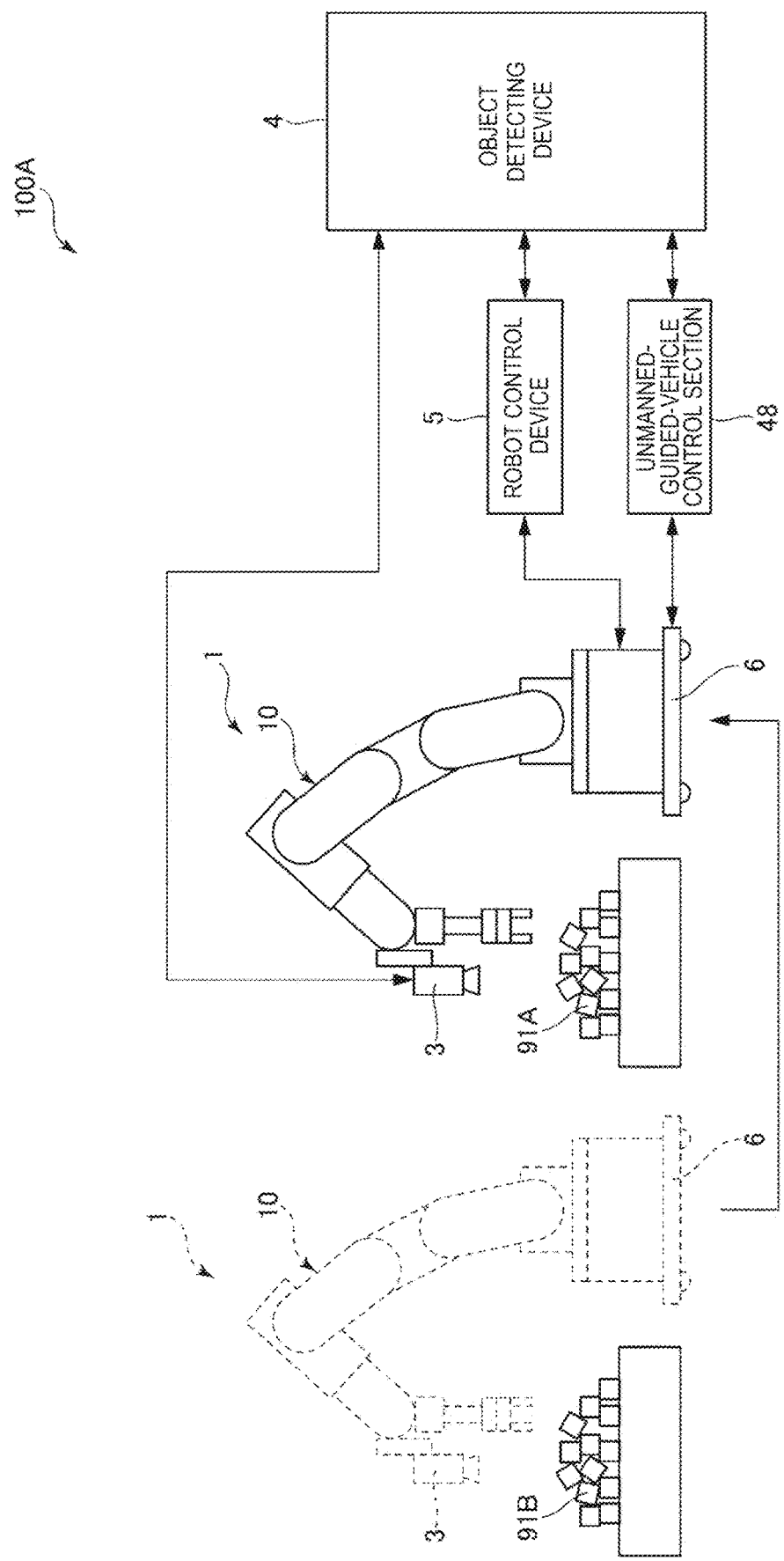
FIG. 7 is a functional block diagram showing a robot system according to a second embodiment.

FIG. 7 is a functional block diagram showing the robot system according to the second embodiment.

The robot system according to the second embodiment is explained below. In the following explanation, differences from the robot system according to the first embodiment are mainly explained. Explanation about similarities is omitted. In FIG. 7, the same components as the components in the first embodiment are denoted by the same reference numerals and signs.

A robot system 100A according to this embodiment is the same as the robot system 100 according to the first embodiment except that the robot system 100A includes an automated guided vehicle 6 mounted with the robot 1.

The automated guided vehicle 6 automatically moves on a predetermined route according to guidance by various guidance schemes. In the robot system 100A according to this embodiment, the robot 1 is mounted on the automated guided vehicle 6.

With such a robot system 100A, the object detecting device 4 can also appropriately recognize both of target objects 91A and 91B placed in places separated from each other. When the places are different, an illumination condition and the like change and visual performance of the target objects 91A and 91B by the camera 3 is also different. However, the object detecting device 4 can prevent, by sequentially updating the estimation model, the change in the visual performance from easily affecting a success rate of holding. Even when the target objects 91A and 91B are placed in the places separated from each other, it is possible to update the estimation model according to the respective places. As a result, it is possible to suppress deterioration in a success rate of holding of the target objects 91A and 91B while constructing the robot system 100A having high mobility using the automated guided vehicle 6.

When the robot 1 is configured such that the position of the robot 1 changes, the same estimation model may be continuously updated even if the position of the robot 1 changes. However, since peripheral environments of the target objects 91A and 91B separated from each other often greatly change, visual performance of an image captured by the camera 3 greatly changes in the robot 1 that holds the target objects 91A and 91B. In this case, if an estimation model used in determining an imaging position/posture for the target object 91A and an estimation model used in determining an imaging position/posture for the target object 91B are the same, a deficiency such as divergence of the estimation model due to update is likely to occur. The update of the estimation model is also likely to deteriorate a success rate of holding to the contrary.

Therefore, the imaging-position/posture determining section 46 desirably initializes the estimation model when the position of the robot 1 changes. In other words, it is desirable to prepare a plurality of estimation models independent from one another in advance and switch the estimation models every time the position of the robot 1 changes. Consequently, since the estimation models are optimally updated according to respective environments, even when a robot system is used to hold (pick) the target objects 91A and 91B while moving like the robot system 100A according to this embodiment, it is possible to suppress deterioration in the success rate of holding the target objects 91A and 91B.

The robot system 100A shown in FIG. 7 includes an automated guided vehicle control section 48 coupled to the automated guided vehicle 6. The automated guided vehicle control section 48 controls driving of the automated guided vehicle 6 based on a control signal output from the robot control device 5. The automated guided vehicle control section 48 outputs a signal corresponding to the position of the automated guided vehicle 6 to the object detecting device 4. The object detecting device 4 may switch the estimation model based on the signal.

In the second embodiment explained above, the same effects as the effects in the first embodiment are obtained.

The robot 1 may be mounted on various trucks and the like without being limited to the automated guided vehicle 6. The target objects 91A and 91B may be placed on a shelf and the like without being limited to the table 92.

3. Third Embodiment

A robot system according to a third embodiment is explained.

Figure 8:
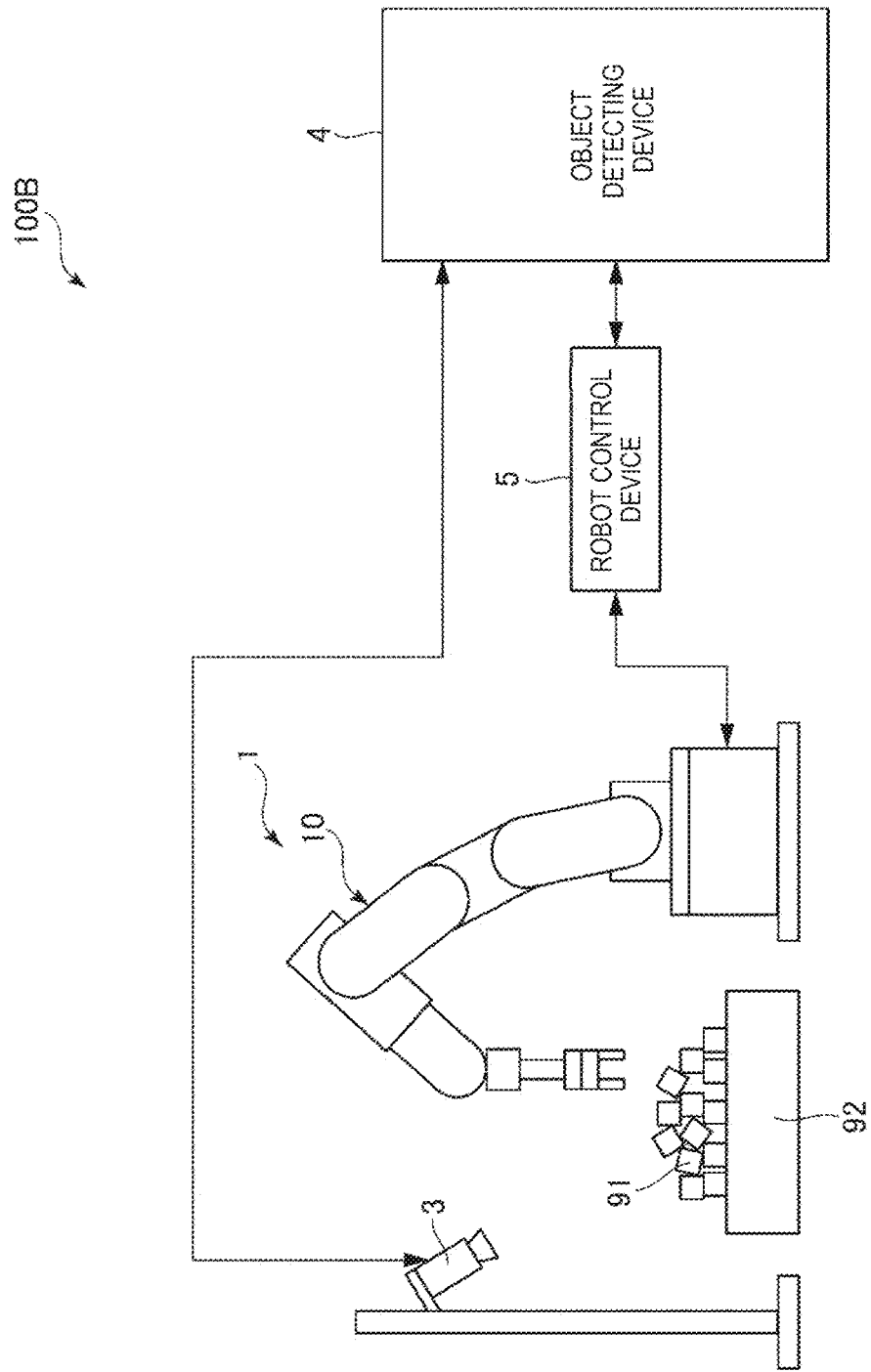
FIG. 8 is a functional block diagram showing a robot system according to a third embodiment.

FIG. 8 is a functional block diagram showing the robot system according to the third embodiment.

The robot system according to the third embodiment is explained below. In the following explanation, differences from the robot system according to the first embodiment are mainly explained. Explanation of similarities is omitted. In FIG. 8, the same components as the components in the first embodiment are denoted by the same reference numerals and signs.

A robot system 100B according to this embodiment is the same as the robot system 100 according to the first embodiment except that the camera 3 (the imaging section) is mounted on a stand 7 away from the robot arm 10 rather than at the distal end portion of the robot arm 10.

The stand 7 is set on a rail or the like laid on a floor on which the robot 1 is set. The camera 3 is fixed to the stand 7 and can image the target object 91 placed on the table 92. Although not shown in FIG. 8, the stand 7 moves on the rail based on a control signal output from the camera control section 41. Consequently, it is possible to dispose the camera 3 in a target imaging position/posture.

In the robot system 100B including such a fixed camera 3, the same effects as the effects of the robot system 100 explained above are obtained.

The object detecting method, the object detecting device, and the robot system according to the present disclosure are explained based on the embodiments shown in the figures. However, the present disclosure is not limited to the embodiments. The components of the sections can be replaced with any components having the same functions. Any other components may be added to the present disclosure. Further, the robot systems according to the embodiments are systems including the six-axis vertical articulated robot. The number of axes of the vertical articulated robot may be five or less or may be seven or more. The robot may be a horizontal articulated robot instead of the vertical articulated robot.

What is claimed is:

1. An object detecting method for detecting an object position/posture of a target object, the object detecting method comprising:
imaging a plurality of target objects with an imaging section and acquiring a first image;
recognizing the object position/posture of the target object based on the first image;
counting, as a number of recognized object positions/postures, a number of successfully recognized object positions/postures of the target object;
outputting, based on the object position/posture of the target object, a signal for causing a holding section to hold the target object;
calculating, as a task evaluation value, a result about whether the target object was successfully held;
updating, based on an evaluation indicator including the number of recognized object positions/postures and the task evaluation value, a model for estimating the evaluation indicator from an imaging position/posture of the imaging section and determining an updated imaging position/posture of the imaging section based on the model after the update;
imaging the plurality of target objects in the updated imaging position/posture and acquiring a second image; and
recognizing the object position/posture of the target object based on the second image.

2. The object detecting method according to claim 1, wherein the first image is a two-dimensional image or a depth image.

3. The object detecting method according to claim 1, wherein the model is a model of Bayesian inference into which a concept of a forgetting rate is introduced.

4. The object detecting method according to claim 1, wherein the task evaluation value includes a result obtained by causing the holding section to hold the target object and perform work using the target object.

5. An object detecting device that detects an object position/posture of a target object, the object detecting device comprising:
an imaging control section configured to capture, with an imaging section, a first image including a plurality of target objects and acquire the first image;
an object-position/posture calculating section configured to recognize the object position/posture of the target object based on the first image;
a recognition evaluating section configured to count, as a number of recognized object positions/postures, a number of successfully recognized object positions/postures of the target object;
a holding-position/posture calculating section configured to calculate, based on the object position/posture of the target object, a holding position/posture of a holding section that holds the target object and output a control signal for causing the holding section to hold the target object in the holding position/posture;

a task evaluating section configured to acquire a result about whether the target object was successfully held by the holding section and calculate a task evaluation value; and an imaging-position/posture determining section configured to update, based on an evaluation indicator including the number of recognized object positions/postures and the task evaluation value, a model for estimating the evaluation indicator from an imaging position/posture of the imaging section and determine an updated imaging position/posture of the imaging section based on the model after the update, wherein the imaging control section causes the imaging section to capture a second image in the updated imaging position/posture and acquires the second image, and the object-position/posture calculating section recognizes the object position/posture of the target object based on the second image.

6. The object detecting device according to claim 5, further comprising a display section configured to display at least one of the number of recognized object positions/postures, the task evaluation value, and the evaluation indicator.

7. A robot system comprising:
a robot including a robot arm;
an imaging section set in the robot arm;
the object detecting device according to claim 5; and
a robot control device configured to control driving of the robot based on a detection result of the object detecting device.

8. The robot system according to claim 7, further comprising an automated guided vehicle mounted with the robot.

9. The robot system according to claim 7, wherein the imaging-position/posture determining section initializes the model when a position of the robot changes.

* * * * *